United States Patent [19]

Fakler et al.

[11] Patent Number: 4,586,226

[45] Date of Patent: May 6, 1986

[54] METHOD FOR FABRICATING A SMALL-ORIFICE FUEL INJECTOR

[75] Inventors: Lyle D. Fakler; Irving Kaith, both of Canoga Park, Calif.

[73] Assignee: Rockwell International Corporation, El Segundo, Calif.

[21] Appl. No.: 538,072

[22] Filed: Sep. 30, 1983

[51] Int. Cl.⁴ ............................................. B21D 53/00
[52] U.S. Cl. ................................. 29/157 R; 29/157 C; 29/423; 29/527.2; 29/DIG. 16; 164/46
[58] Field of Search ................... 29/157 C, 157 R, 418, 29/423, DIG. 16, 434, 527.2; 204/115; 164/91, 46; 239/DIG. 19

[56] References Cited

U.S. PATENT DOCUMENTS

| | | | |
|---|---|---|---|
| 570,125 | 10/1896 | Forsyth et al. | 204/281 |
| 1,869,260 | 7/1932 | Jenkins | 29/157 C |
| 2,350,952 | 6/1944 | Acord | 29/157 C |
| 2,423,203 | 7/1947 | Oldham | 29/157 C |
| 3,595,025 | 7/1971 | Stockel | 29/157 C X |
| 3,599,430 | 8/1971 | Kromley | 239/DIG. 19 X |
| 3,613,208 | 10/1971 | Seberg et al. | 29/163.5 R |
| 3,690,103 | 9/1972 | Dedenna et al. | 29/157 C X |
| 3,692,637 | 9/1972 | Dedenna et al. | 29/157 C X |
| 3,876,149 | 4/1975 | Futerko | 29/157 C X |
| 4,081,019 | 3/1978 | Kulig | 29/434 X |
| 4,147,201 | 4/1979 | Rabinovitch et al. | 164/46 |
| 4,187,595 | 2/1980 | Kuhn, Jr. | 29/157 C |

FOREIGN PATENT DOCUMENTS 2657474  6/1978  Fed. Rep. of Germany ........ 164/91

*Primary Examiner*—Howard N. Goldberg
*Assistant Examiner*—Ronald S. Wallace
*Attorney, Agent, or Firm*—H. Fredrick Hamann; Harry B. Field; Clark E. DeLarvin

[57] ABSTRACT

A method for forming small-orifices 20 in the face plate 10 of an injector 12, especially a liquid propellant injector for a rocket engine. A stainless steel base plate is given a first layer 28 of electrodeposited Ni and fuel feed passages 24 and 26, respectively, are formed therethrough for fuel and oxidizer transfer. The feed passages 24 and 36 are filled with wax and silver is worked into the surface of the wax to permit electrodeposition of face plate 10. Connecting bores 42 to the perforations are made through the face plate nickel layer 40. Plastic mandrels 44 are fabricated, having legs 46 with support sections 48 and orifice-forming sections 50 and coupling tabs 54 for tying the legs 46 together. The support legs 48 of the mandrels 44 are inserted in the connecting bores for support and another layer 60 of Ni is electrodeposited to enclose the orifice-forming sections 50 of the mandrel legs 46. The uncovered tabs 54 of the mandrels 44 are machined off and the legs of the mandrels 44 are dissolved, leaving properly sized and oriented orifices and ducts extending from the surface 16 of the face plate to the fuel and oxidizer passages 24 and 26 within.

9 Claims, 8 Drawing Figures

METHOD FOR FABRICATING A SMALL-ORIFICE FUEL INJECTOR

BACKGROUND OF THE INVENTION

1. Field of the Invention

This invention relates to an improved-performance face plate of a fluid injector and especially to a method of fabricating an improved-performance, propellant injector face plate for a rocket engine.

2. Description of the Prior Art

A liquid-propellant rocket engine generally has an injector which has a face plate containing a multiplicity of orifices through which fuel and oxidizer (the propellants) are injected into the combustion chamber of the rocket engine. In the past, these orifices have been formed primarily in two ways, the first being machine drilling and the second being electrical discharge machining.

In order to improve combustion performance, it is desirable to maximize the number of orifices per unit area which, in turn, requires that a multiplicity of small-diameter orifices (holes) be fabricated. It is also desirable that the location of the orifices be extremely precise and that the surface finish of the orifices (holes) be repeatable. It is also very desirable that the locations of the impingement points, i.e., the points at which the fluids from each set of associated orifices intersect, be precisely achievable and repeatable so that performance is improved and high combustion efficiencies are achieved.

High combustion efficiency also leads to weight savings, improved propellant utilization, and higher specific impulse for a rocket engine.

SUMMARY OF THE INVENTION

A face plate for a fluid injector in accordance with the present invention is formed by using a type of mandrel, or preform unit, having legs with orifice-forming sections and support sections. The outside diameters of the orifice-forming sections are equal to the diameters of the orifices which are desired in the face plate. The orifice-forming sections of the legs are set at the angles which will give the desired impringement point of fluids ejected from the orifices.

The support sections of the mandrels are set into acceptor holes formed in the face plate and a bonded layer of rigid material is built up, preferably by electrodeposition, to enclose the orifice-forming sections. The sections of the mandrels extending outside the bonded layer are removed and the surface is smoothly finished. The portions of the mandrels remaining in the face plate are then dissolved.

The process creates an injector face plate with extremely precise orifices having smaller diameters than were previously achievable and with more precise angular settings. These advantages provide face plates with a greater number of orifices per unit area, and greater precision in the location of the impingement points of injected fluids. In rocket engines where these face plates are utilized for the propellant injector component, greater propellant combustion efficiencies can be achieved and savings in weight, propellant and cost are attainable.

OBJECTS OF THE INVENTION

An object of this invention is to form small-orifices in fluid injector plates, orifices which are smaller than those which have hitherto been attainable.

Another object is to precisely locate the orifices in injector face plates.

A further object is to achieve precise setting of the angles at which the orifices in injector face plates are oriented.

Yet another object is to achieve savings in the fabrication of rocket-engine, liquid-propellant, injector face plates with respect to efficiency, size, weight and cost.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
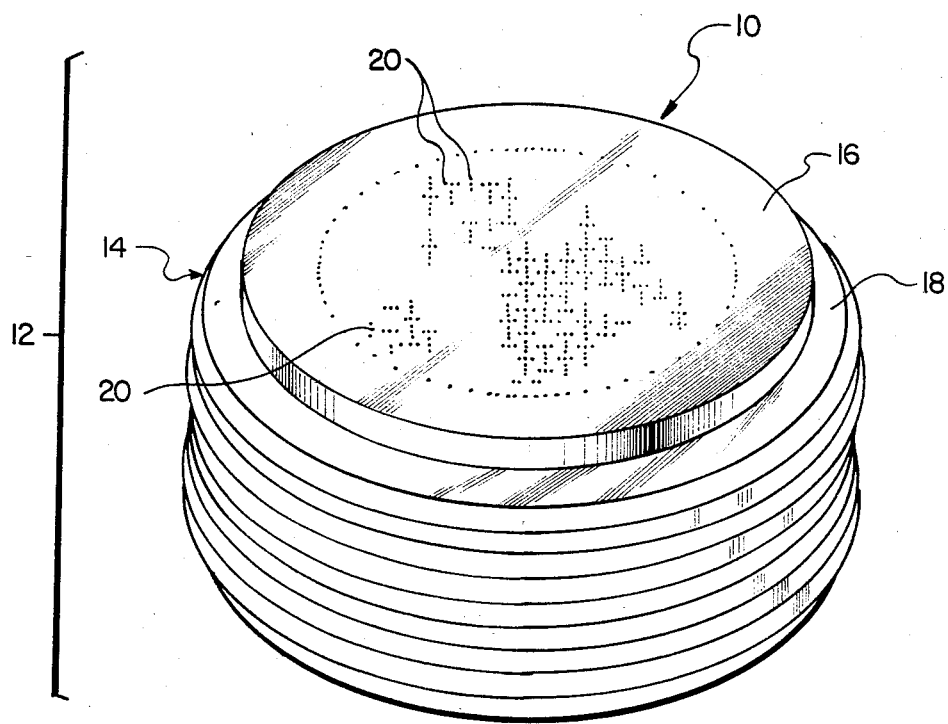
FIG. 1 is a perspective view of a liquid propellant injector showing a triplet injector-element pattern on the face plate.

A face plate 10 for a propellant injector 12 for a rocket engine may, for example, be of the form shown in FIG. 1. Here, the base or support 14 of the injector face plate is substantially cylindrical and the face plate 10 is a disk with a circular periphery which is bonded to the support 14. The support 14 and face plate 10 are formed from a rigid material, e.g., stainless steel, while the face plate orifice surface is fabricated from an electrodeposited material, e.g., nickel. The outer surface 16 of the face plate 10 may be elevated above the surface 18 of the support member 14.

Figure 2:
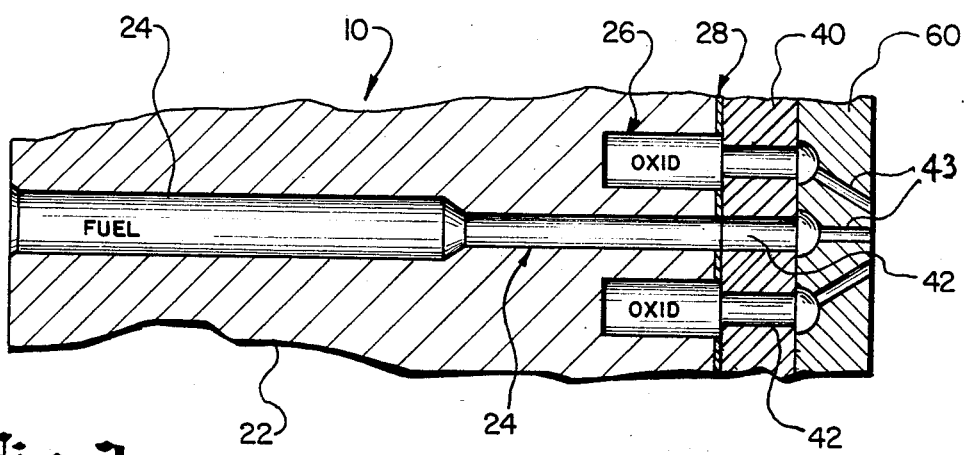
FIG. 2 is a partial, broken-away, sectional view of the face plate showing a triplet injector element and its fuel and oxidizer feed passages and ducts.

The particular element pattern used in the face plate 10 shown in FIG. 1 is sets of three orifices 20 aligned in a row, the axis of each set of orifices being perpendicular to that of each of its neighboring sets; however, some of the peripheral sets here have only two orifices. In this particular triplet, the central orifice feeds fuel and the two outer orifices feed oxidizer to the combustion chamber, as is evident in FIG. 2. Many other patterns could be employed.

The face plate 10 comprises a base plate 22 in which fuel and oxidizer feeds 24 and 26 are formed by any suitable method, such as drilling and milling.

Figure 3:
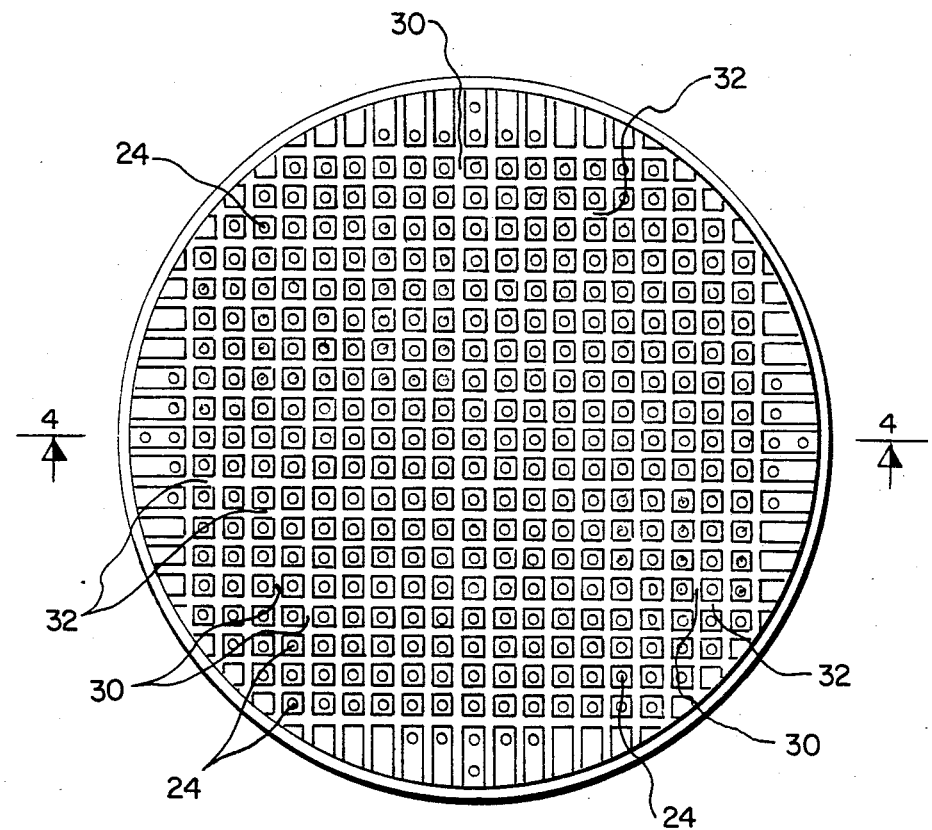
FIG. 3 is a partial plan view of the face plate as it appears after the oxidizer channels and the fuel feed passages have been machined.
Figure 4:
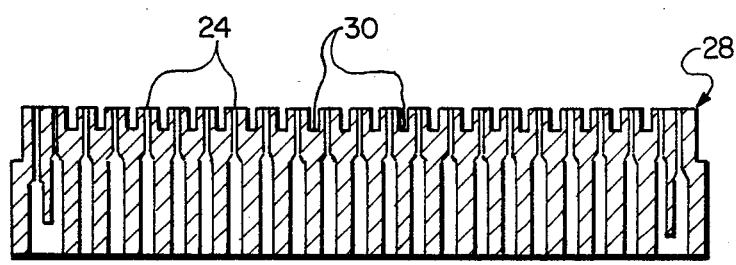
FIG. 4 is a partial, broken-away sectional view of the face plate taken along line B—B of FIG. 3.
Figure 5:
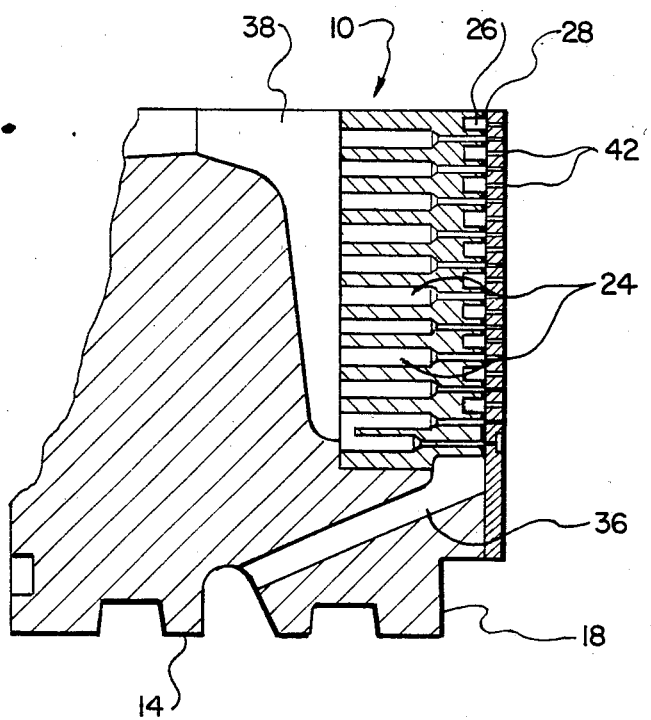
FIG. 5 is a partial, broken-away sectional view of the face plate after electrodeposition of the first material layer and fabrication of connecting acceptor holes for the mandrel legs.

The manifolds which will feed oxidizer to the proper orifices are now machined into the face plate 10. These manifolds comprise sets of vertical and horizontal (as they appear in FIG. 3) channels, or grooves, 30 and 32, respectively, which are coupled to feed channels 36 in the support member 14 when the face plate 10 is bonded into place (see FIG. 5). FIG. 4 shows a cross-sectional view taken through FIG. 3 at this stage of the process. It should be noted that the oxidizer passages 26 shown in FIG. 5 appear as individual passageways in this cross-sectional view, and actually correspond to the horizontal channels 32 shown in the plan view of FIG. 3.

The support body 14 is also formed with another manifold 38 for supplying fuel to the fuel feed passages 24.

The outer surface of the base plate 22 is now ready for the processes of the present invention.

Wax is deposited in the channels 30 and 32 and silver powder is worked into the surface of the wax. A second layer 40 of metal, preferably Ni, is formed, preferably by electrodeposition, over the first layer 28. The outer face of this layer is then rough-machined. The silver powder allows electrodeposition to take place on the surface of the wax which is electrically nonconductive. The wax prevents the layer 40 from being deposited in and filling up the grooves. Although the wax can be removed easily, the layer 40 cannot easily be removed from the channels.

Although two layers 28 and 40 have been electrodeosited, it should be understood that only 40 is absolutely necessary. The thin 0.005" to 0.015" layer 28 is used for two reasons: first, to permit a rigorous inspection of the electrodeposited Ni to face plate 10 bond; and second, to make subsequent activation for electrodeposition of layer 40 more easily and reliably accomplished. If the base plate 22 were Ni or some other readily electroplatable material, layer 28 could be eliminated. The depth of layer 40 is determined by hydraulic structural requirements and the required support of the mandrel legs 46, hereinafter to be described. This is so because the mandrels 44 are supported by this layer and the connecting bores 42 in which the support sections 48 are inserted must couple together the orifices 20 which are later formed and the fuel and oxidizer feeds 24 and 26.

Bores 42 are now machined through the layer 40 to connect with the fuel and oxidizer feeds 24 and 26.

Figure 6:
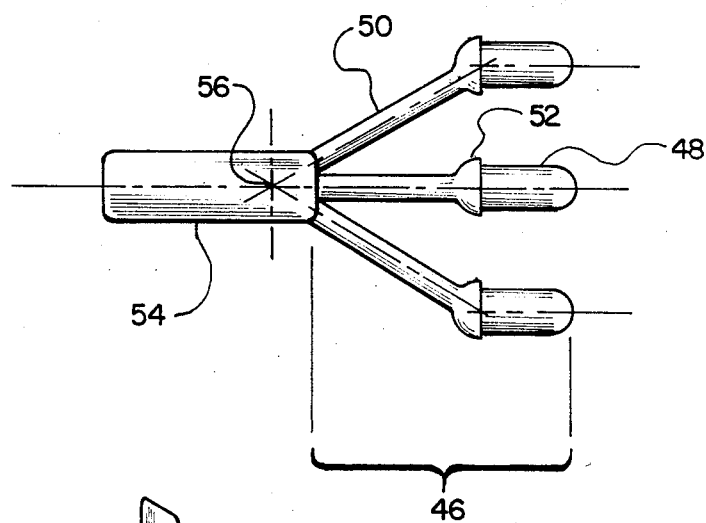
FIG. 6 is a side view of a triplet (three-legged) mandrel as employed in this invention.
Figure 7:
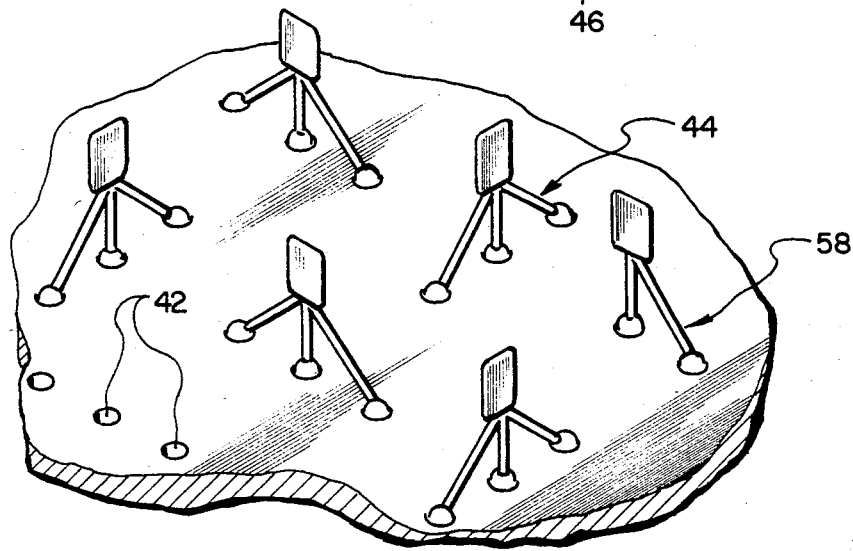
FIG. 7 is a pictorial view of some mandrels inserted into the acceptor holes in the face plate.

Using plastic molding techniques and precision dies, mandrels 44 are molded. The mandrels 44 (see FIG. 6 and FIG. 7), in this case with three legs 46, each comprising a support section 48 on the bottom which widens into a hemispherical shoulder section 52. An orifice-forming section 50 is connected to the top of the shoulder section 52 and the tops of the orifice-forming sections 50 are connected to a coupling tab 54 which is rectangular in shape, as shown, but may be of other configurations, e.g., circular. The orifice-forming sections 50 are oriented angularly so that their longitudinal axes intersect at a desired impingement point 56. A typical angle between the axes of an outer leg and the inner leg might be 30°, for example. The outer diameter of each orifice-forming section 50 is the dimension desired for the diameter of the orifice which the section is designed to form. The outer periphery of each said section 50 is circular here, but could be square, or rectangular, etc., as desired. FIG. 7 shows some of the mandrels 44 set in place in the holes 42. It should be noted that the reasons the perforations 20 are so precise and repeatable are firstly, that all the mandrels can be reproduced from the identical die and, thus, all the mandrels are exactly alike, and secondly, that the electrodeposition process faithfully reproduces the exact shape and size of the mandrel legs in the propellant feed ducts 43 which remain after the mandrel legs are dissolved.

Although almost all of the sets of bores 42 are triplets, some of the bores at the periphery of the pattern are doublets (two orifices) and for these bores, doublet mandrels 58 are employed. The mandrels can be formed in different configurations and with different numbers of legs, as desired. The mandrels 44 may be fabricated from plastic materials, such as polyethylene, for example, which are removable, e.g., chemically or thermally dissolvable. Polyethylene, for example, is dissolvable in perchlorethylene.

Figure 8:
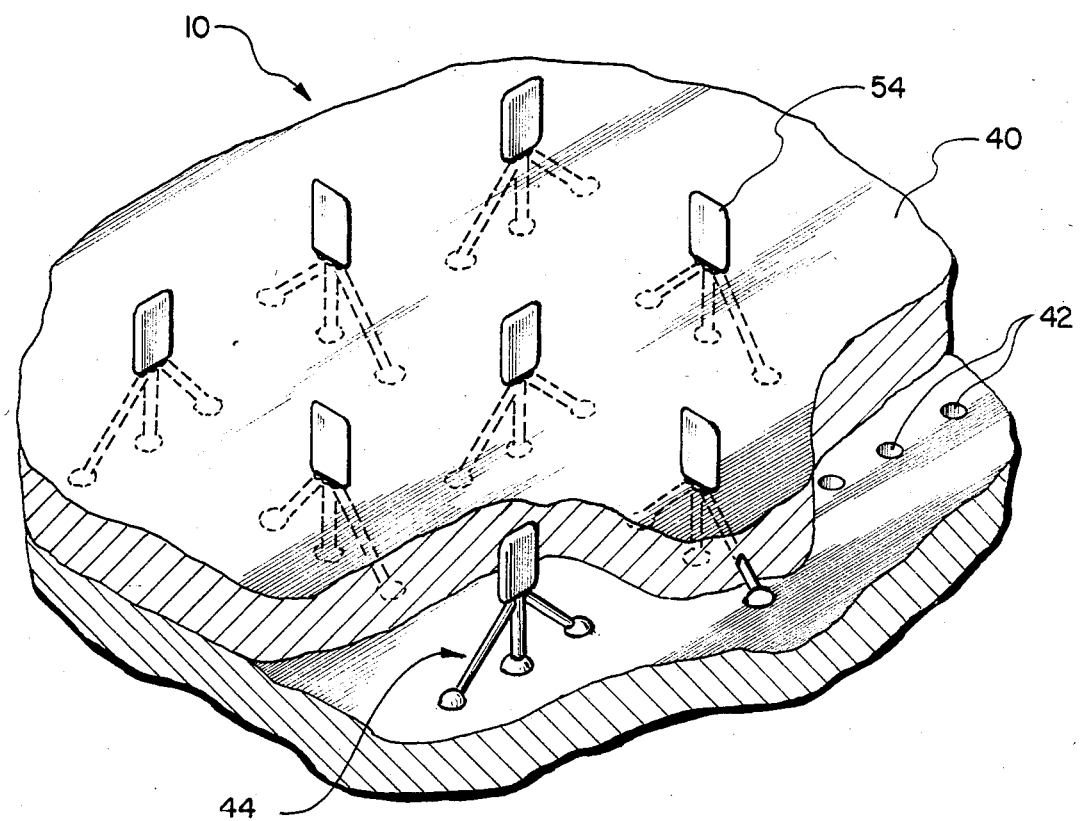
FIG. 8 is pictorial view showing the condition of the face plate after electrodeposition of the third layer; only the mandrel tabs are exposed.

The mandrels 44 and 58 are installed in the support holes in layer 40 and a third layer 60 (see FIG. 2) of metal, e.g., Ni, is now laid down, preferably by electrodeposition, on second layer 40 to a depth which covers the orifice-forming sections 50 of the mandrel legs 46, but not the tabs 54 (see FIG. 8). The tabs 54 are then removed by any suitable process, such as machining, the balance of the mandrel remaining intact so that the outer surface 16 of the face plate 10 can be finished smooth and flat without getting machine chips in the small orifice holes.

The propellant injector 12 is now dipped into a solvent, e.g., perchlorethylene, which dissolves the legs 46 of the mandrels and means, such as heat, is used to remove the wax. The propellant injector 12 for a rocket engine is now completed.

TABLE 1

| | | INJECTOR COMPARISON NUMBER ORIFICES PER SQ. INCH OF FACE | | | |
|---|---|---|---|---|---|
| TYPE OF INJECTOR | LBS.-THRUST | % C* | ELEMENT TYPE | FABR. METHOD | ORIF./ IN$^2$ |
| LM Ascent | 3750 | 95.8 | Doublet | EDM | 6.6 |
| OME | 6000 | 98.7 | Doublet | EDM | 15.3 |
| MX Axial | 2500 | 98.5 | Doublet | Drill & Etch | 15.53 |
| LOX/RP-1 | 2.00 D$_c$ | 95.6 | Triplet | Drill | 25.79 |
| LOX/CH$_4$ | G.G for | 97.0 | Triplet | Drill | 34.39 |
| LOX/CH$_4$ | 18K lb. F. | 97.5 | Pentad | Drill | 30.25 |
| LOX/CH$_4$ | Staged Combustion | No Test | Triplet | Platelet | 76.43 |
| LOX/CH$_4$ | System | 99.0 | Triplet | Mandrels | 93.0 |
| ASEC | 3750 | 99.6 | Triplet & Doublets | Mandrels | 97.4 |

Table 1 is a comparison of nine types of injectors for liquid propellants for rocket engines. Injectors 8 and 9 were manufactured in accordance with the technique of the present invention. Note that the number of orifices per square inch of injector face is considerably higher than achievable previously, and that the efficiency of combustion of the fuel (i.e., %C*) is the best yet attained.

It should be observed that the surfaces which undergo electrodeposition should be cleaned and prepared before the process starts in accordance with techniques in the art which are well known and therefore not described herein.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for fabricating a face plate for a fluid injector comprising the steps of:
   obtaining at least one mandrel formed from a plastic material and having a plurality of legs each of which is connected to a coupling tab at one end, has an intermediate orifice-forming section and a support section at another end;
   forming bores in the face plate to accept the support sections of the legs of at least one mandrel;
   placing the support sections of the mandrel legs in said bores;
   forming a bonded layer of rigid material around the orifice-forming sections of said mandrel;
   removing the tab section of said mandrel;
   dissolving out the remaining sections of said mandrel from the bonded layer to leave the face plate with ducts and orifices therein; and
   coupling an inner end of each duct to a conduit capable of containing fluid.

2. A method as in claim 1, wherein said bonded layer is formed by electrodeposition.

3. A method as in claim 1, wherein said mandrel is fabricated from polyethylene.

4. A method as in claim 3, wherein said mandrel is dissolved by the use of perchlorethylene.

5. A method for forming small-orifices in a face plate for a liquid propellant injector for a rocket engine, utilizing a set of mandrels, the face plate having a matrix of fuel and oxidizer feed passages therein, said method comprising the steps of:
   forming a first bonded layer of a rigid material on an outer surface of said face plate;
   forming a predetermined pattern of bores through said bonded layer, each bore being in fluid communication with one of said feed passages;
   obtaining a set of mandrels formed from a plastic material, each mandrel having a plurality of legs connected to a coupling tab at one end, a support section at another end and an intermediate section comprising an orifice-forming section, each of said legs orifice-forming sections being angularly disposed and having a longitudinal axis which intersects at a common predetermined impingement point;
   placing the support sections of the mandrel legs in said bores, at least one of the legs being located in a bore communicating with the fuel feed passages of said matrix and another of the legs being in a bore communicating with the oxidizer feed passages of said matrix;
   forming another bonded layer of rigid material on the first bonded layer to a depth sufficient to enclose the orifice-forming sections of the legs;
   removing the tabs of the mandrels remaining outside said layers; and
   dissolving out the remaining sections of the mandrels from the face plate to leave ducts and orifices therein in fluid communication with the fuel and oxidizer feed passages of said matrix.

6. A method as in claim 5, wherein said layers are formed by electrodeposition.

7. A method as in claim 5, wherein said rigid materials forming said layers are metallic.

8. A method as in claim 5, wherein the rigid material forming said layers is nickel and the face plate is stainless steel.

9. A method as in claim 5, wherein the outer surface of the face plate is finished so that it is smooth.

* * * * *